June 13, 1939.  L. J. BISHOP  2,161,893

POWER DRIVE UNIT

Filed May 10, 1937  2 Sheets-Sheet 1

INVENTOR
LEONARD J. BISHOP.
BY
ATTORNEYS

June 13, 1939.  L. J. BISHOP  2,161,893
POWER DRIVE UNIT
Filed May 10, 1937   2 Sheets-Sheet 2

INVENTOR
LEONARD. J. BISHOP.
BY
ATTORNEYS

Patented June 13, 1939

2,161,893

UNITED STATES PATENT OFFICE 2,161,893

POWER DRIVE UNIT

Leonard J. Bishop, Detroit, Mich., assignor to Mechanical Handling Systems, Inc., Detroit, Mich., a corporation of Michigan Application May 10, 1937, Serial No. 141,846

3 Claims. (Cl. 74—290)

The invention has for one of its objects to provide a very compact assembly, including a prime mover and reduction gearing connected to the prime mover and capable of effecting great reduction in speed with correspondingly great increase in torque and also capable of operating through a relatively wide range. The invention has for another object to so construct and arrange the parts that they may be housed in a relatively small casing occupying relatively little floor space area, consideration being given to the great reduction adapted to be effected by the unit. The invention has for a further object to provide an improved means for varying the reduction.

These and other objects of the invention will become apparent from the following description and claims, taken in connection with the accompanying drawings, in which Figure 1 is a plan view, with the casing broken away, of a power drive unit showing an embodiment of my invention;

Figure 1:
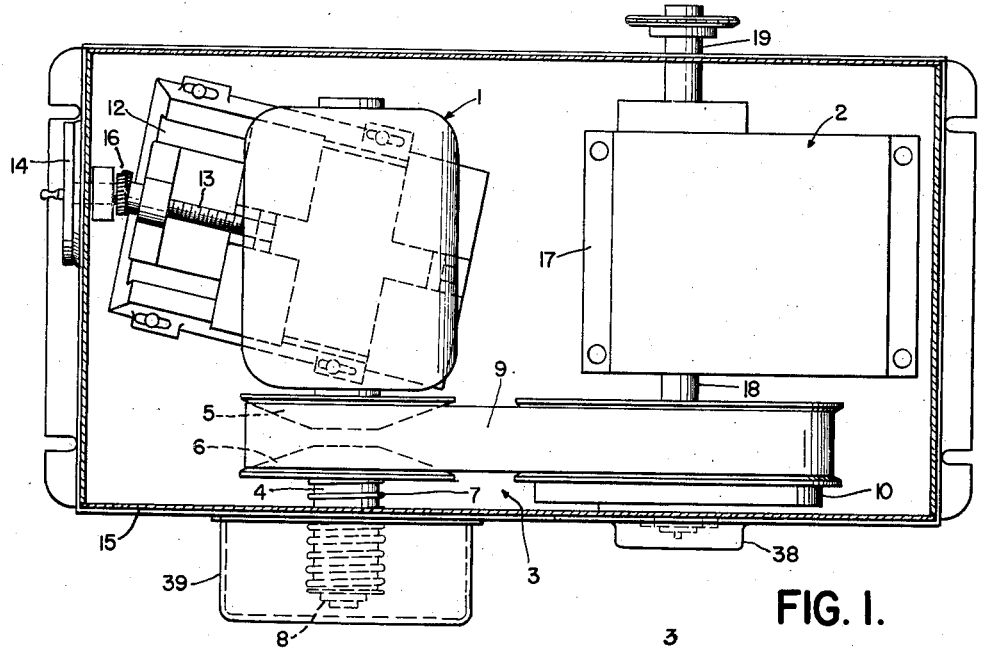
Figure 2:
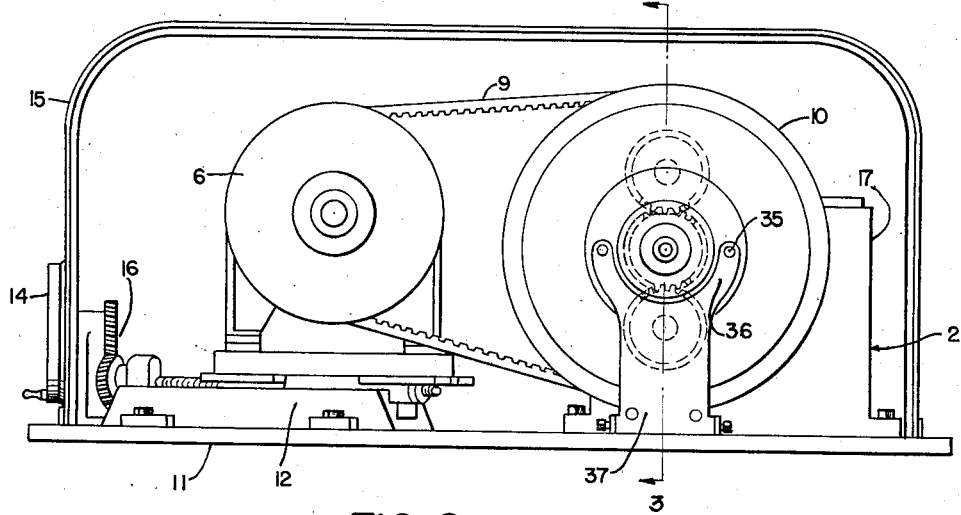
Figure 2 is a side elevation with the casing broken away.

The power drive unit comprises the prime mover 1, the gear reduction mechanism 2 and the variable speed mechanism 3 for driving the gear reduction mechanism from the prime mover. The prime mover is an electric motor having the shaft 4. The variable speed mechanism is of the Reeves type in which the drive pulley comprises two opposed cone-faced discs 5 and 6 secured to the motor shaft 4 for rotation therewith as a unit, the disc 5 being fixed to the motor shaft and the disc 6 being mounted upon the motor shaft to move axially thereof toward and away from the disc 5. A suitable coil spring 7 encircling the end of the motor shaft and located between the disc 6 and the abutment 8 upon the end of the motor shaft yieldably urges the disc 6 toward the disc 5. 9 is a V-belt shaped to properly engage the discs 5 and 6 and also the driven pulley 10. The arrangement is such that movement of the prime mover 1 in a direction away from the pulley 10 causes the V-belt 9 to move inwardly toward the axes of the discs 5 and 6, thereby forcing the disc 6 away from the disc 5 against the resistance offered by the spring 7. As a result, the V-belt 9 assumes a smaller arc of contact with the two discs, thereby reducing the speed of the pulley 10. On the other hand, movement of the prime mover toward the pulley 10 increases the arc of contact of the V-belt with the discs, with the result that the speed of the pulley 10 is increased.

The prime mover is mounted upon the supporting base 11 to maintain the center line of the V-belt 9 in the same relation to the discs 5 and 6, irrespective of the adjustment of the prime mover toward or away from the pulley 10. More particularly, the prime mover is mounted to slide upon the guide 12 which is arranged at an angle to maintain the above relation. 13 is a suitable screw threadedly engaging the prime mover and adapted to be operated from the handle 14 at one end of the casing 15 by means of the gearing 16.

The gear reduction mechanism 2 comprises the gear reduction device 17 which is mounted upon the base 11 in close proximity to the prime mover 1. This gear reduction device has the drive shaft 18 and the driven shaft 19, the axis of the drive shaft being parallel to that of the motor shaft 4. In the present instance, the axis of the driven shaft is also parallel. This driven shaft extends outwardly through a side of the casing 15 and in the present instance is adapted to form the power take-off shaft for connection to the conveyor. 20 is reduction gearing located between the drive and driven shafts and constructed to effect a material reduction in speed of the driven shaft, as compared with that of the drive shaft.

Figure 3:
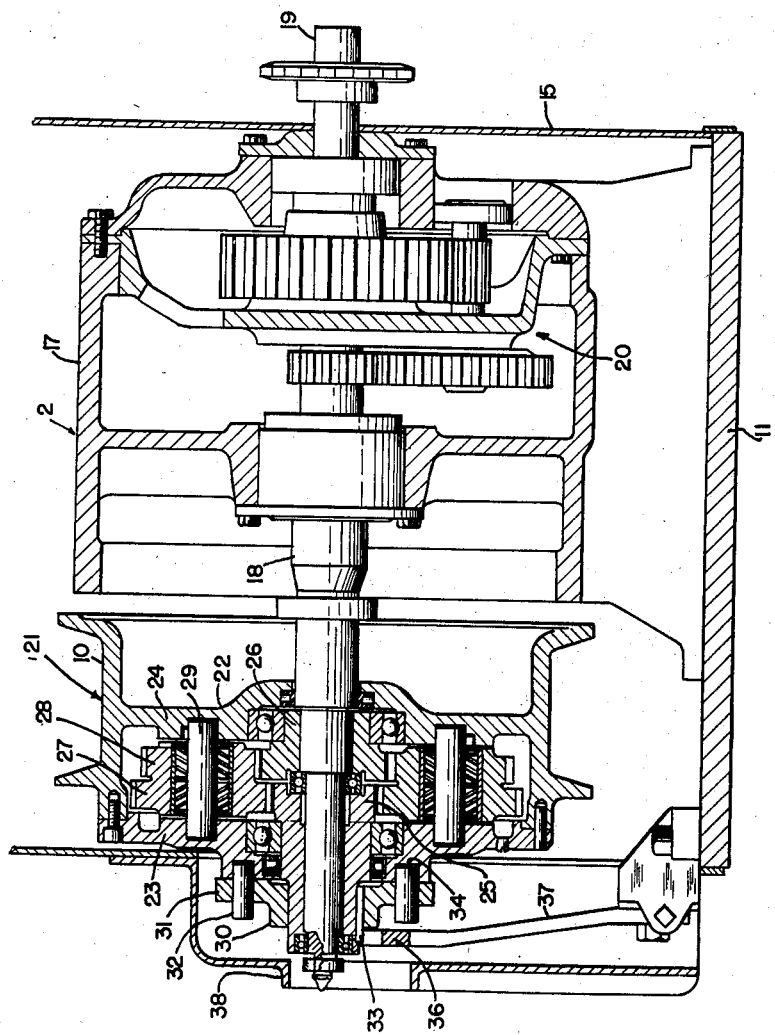
Figure 3 is a cross section on the line 3—3 of Figure 2.

For the purpose of making the gear reduction mechanism capable of effecting a much greater reduction, I have provided the gear reduction pulley 21 which is mounted upon the drive shaft 18 and is located closely adjacent to the gear reduction device 17 and within the casing 15. This gear reduction pulley is of the planetary type and comprises the rotatable pulley frame 22, the periphery of which is formed with the pulley 10. This frame is formed of the two sections 23 and 24. 25 and 26 are drive and driven gears respectively journaled on and connected to the drive shaft 18. These gears have extensions on which the sections 23 and 24 are journaled. 27 and 28 are pairs of gears carried by and movable in unison with the frame 22, with the gears of each pair rotatable as a unit about their axes. The gears 27 mesh with the drive gear 25, while the gears 28 mesh with the driven gear 26. The gears 27 are larger and have a greater number of teeth than the gears 28, while the driven gear is larger and has a greater number of teeth than the drive gear 25. The gears 27 and 28 of each pair, as shown, are journaled upon the pin 29, which extends between the sections 23 and 24. 30 is an adjustable clutch member, it being shown in the present instance in the nature of the plate 31 and the transverse pins 32. This clutch member is mounted upon an extension of the drive gear 25 to be axially slidable thereof, but is suitably secured thereto as by means of the key 33 to rotate therewith. This clutch member in one position of adjustment, as illustrated in Figure 3, is adapted to abut the section 23 of the pulley frame, at which time the pins 32 extend into recesses or bores 34 in the section 23. In the other position of adjustment, the clutch member is adapted to be moved away from the section 23 to disengage the pins from their respective bores and to engage the opposite ends of these pins in the recesses or holes 35 which are formed in the furcations 36 of the arm 37. This arm is fixedly secured to the supporting base 11 and extends upwardly with its furcations embracing the drive shaft 18. It will be noted that the gear reduction pulley is so formed that the sections 23 and 24 of the frame 22 are substantially wholly within the confines of the supporting base 11. However, by reason of the arm 37 and the clutch member 30, the side plate of the casing 15 is formed with a relatively shallow boss 38 to inclose these parts. It will also be noted that the same side of the casing is also provided with a relatively shallow boss 39 for enclosing the outer end of the motor shaft 4 and the coil spring.

In operation, it will be seen that the driven shaft of the gear reduction device 17 can be driven at a greatly reduced speed and at a varied rate, which is dependent first upon the particular adjustment of the Reeves type of variable speed mechanism, and second, upon the position of the clutch member 30 of the gear reduction pulley 21. When this clutch member is in engagement with the adjacent section of the frame to connect the drive gear 25 with the frame so that both rotate in unison, the drive shaft 18 will be driven at the same rate as the pulley 10. However, when the clutch member is adjusted out of engagement with the adjacent section of the frame into clutching engagement with the arm 37, the drive shaft will be driven in the same direction at a greatly reduced rate, as compared with that of the pulley 10.

The sides of the casing are detachably secured in place by suitable means, such as bolts, so that, if desired, the sides may be readily removed to provide for access to the parts of the power drive unit.

It will be seen that the parts of the power drive unit are arranged in close proximity to each other and also that they are so constructed as to provide a great reduction in speed between the driven shaft which is adapted to form the power take-off shaft and the shaft of the prime mover with correspondingly great increase in torque. In addition, it will be seen that the reduction of two of the mechanisms may be readily varied, thereby providing for a relatively wide range of reduction. Furthermore, the power drive unit may be housed in a relatively small casing occupying relatively little floor space area when considering the great reduction of which the unit is capable.

What I claim as my invention is:

1. In a power drive unit, a supporting base and an arm thereon, a prime mover upon said base having a rotatable shaft, a gear reduction device upon said base having rotatable drive and driven shafts, a gear reduction pulley upon said drive shaft comprising a rotatable pulley frame, a driven gear connected to said drive shaft, a drive gear in axial alignment with said driven gear, gears carried by and movable in unison with said frame and rotatable as a unit about their axes, said carried gears meshing with said drive and driven gears, and adjustable means for alternatively connecting said drive gear to said frame to rotate in unison therewith and to said arm to hold said drive gear from rotation, and variable speed belt drive means for driving said frame from said shaft of said prime mover.

2. In a power drive unit, a supporting base having an upwardly extending arm, a prime mover upon said base having a rotatable shaft, a gear reduction device upon said base having rotatable drive and driven shafts, a gear reduction pulley upon said drive shaft comprising a rotatable pulley frame, drive and driven gears respectively journaled on and connected to said drive shaft, said frame being journaled on said gears, gears carried by and movable in unison with said frame and rotatable as a unit about their axes, said carried gears meshing with said drive and driven gears, and an adjustable clutch member adapted in one position to connect said drive gear to said frame to rotate in unison therewith and in another position to connect said drive gear to said arm to hold said drive gear from rotation, and variable speed belt drive means for driving said frame from said shaft of said prime mover.

3. In a power drive unit, a supporting base and an arm thereon, a gear reduction device upon said base and having rotatable drive and driven shafts, a prime mover adjacent said gear reduction device and having a rotatable shaft parallel to the drive shaft of said gear reduction device, a drive pulley upon the shaft of said prime mover comprising two opposed cone-faced discs mounted for axial movement relative to each other, a gear reduction pulley mounted upon the drive shaft of said gear reduction device adjacent said drive pulley and comprising a rotatable pulley frame, drive and driven gears respectively journaled on and connected to said drive shaft, gears carried by and movable in unison with said frame and rotatable as a unit about their axes, said carried gears meshing with said drive and driven gears, an adjustable clutch member adapted in one position to connect said drive gear with said frame to rotate in unison therewith and in another position to connect said drive gear to said arm to hold said drive gear from rotation, a belt connecting said drive pulley and said gear reduction pulley, and means for adjusting the position of said prime mover to vary the distance between the axis of the drive pulley and the axis of the gear reduction pulley.

LEONARD J. BISHOP.